United States Patent
Hayes

(10) Patent No.: US 6,759,476 B1
(45) Date of Patent: Jul. 6, 2004

(54) FLEXIBLE THERMAL CONTROL COMPOSITE

(76) Inventor: Claude Q. C. Hayes, 3737 Third Avenue, #308, San Diego, CA (US) 92103

( * ) Notice: Subject to any disclaimer, the term of this patent is extended or adjusted under 35 U.S.C. 154(b) by 0 days.

(21) Appl. No.: 09/615,507

(22) Filed: Jul. 13, 2000

Related U.S. Application Data

(60) Provisional application No. 60/143,722, filed on Jul. 14, 1999.

(51) Int. Cl.[7] .............................................. C08L 27/12
(52) U.S. Cl. ...................... 524/544; 524/545; 524/80; 524/81; 525/57; 525/199; 428/421
(58) Field of Search .................. 524/544, 545, 524/80, 81; 525/27; 428/421, 221, 304.5, 308.4, 312.2, 312.6, 312.8, 315.5, 323, 327, 328, 411.1, 423.1, 480, 500

(56) References Cited

U.S. PATENT DOCUMENTS

| | | | | |
|---|---|---|---|---|
| 4,632,865 A | * | 12/1986 | Tzur | ........................ 428/304.4 |
| 4,825,939 A | * | 5/1989 | Salyer et al. | .................. 165/53 |
| 5,722,482 A | * | 3/1998 | Buckley | ....................... 165/10 |
| 6,207,738 B1 | * | 3/2001 | Zuckerman et al. | ......... 524/156 |

* cited by examiner

*Primary Examiner*—James J. Seidleck
*Assistant Examiner*—Melanie Bissett
(74) *Attorney, Agent, or Firm*—McCarter & English, LLP

(57) ABSTRACT

A flexible thermal control composite comprising a natural or synthetic polymer and an endotherm dispersed, distributed and suspended within said natural or synthetic polymer i.e. "P"olymer "C"ontaining an "E"ndothermic "A"gent (PCEA). The PCEA can be formed into thin and thick films. It can be drawn, molded, extruded and spun into fibers or all dimensions. It can be formed and chopped into PCEA mulch. Irrespective its final form, the PCEA can be used in insulating, thermoprotecting, heat absorbing applications on the one hand, and heat maintenance applications of all types on the other.

20 Claims, 6 Drawing Sheets

FIG. 13
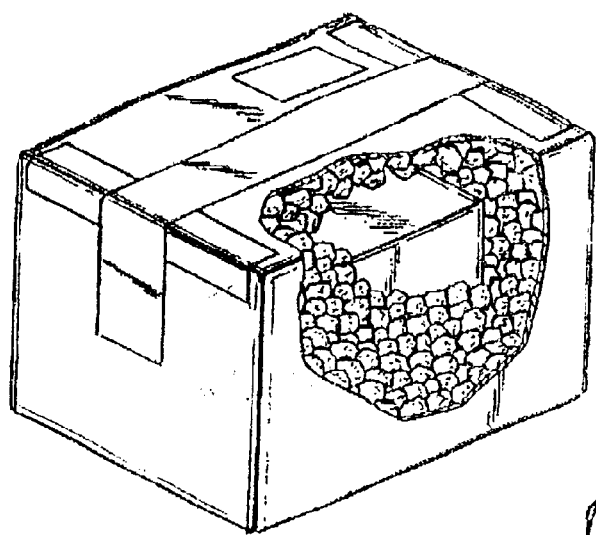
FIG. 15     FIG. 14
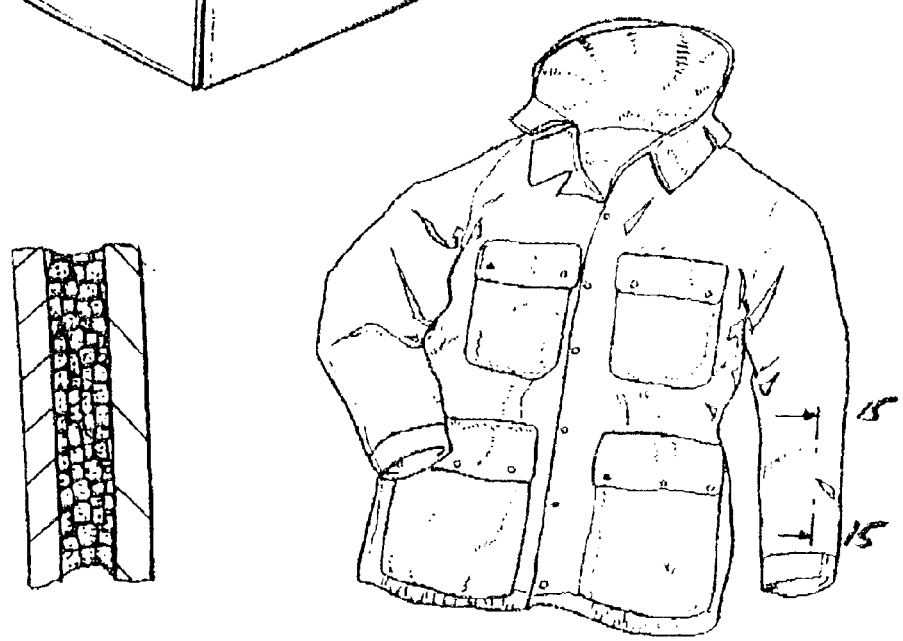
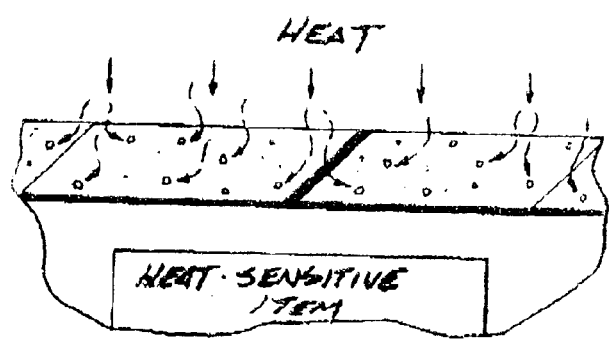
FIG. 16

FLEXIBLE THERMAL CONTROL COMPOSITE

CROSS-REFERENCE TO RELATED APPLICATIONS

The present application claims the benefit of a provisional application filed on Jul. 14, 1999, and assigned Ser. No. 60/143,722.

FIELD OF THE INVENTION

The present invention relates to a new composition of matter, a thermal control composite comprising a polymer and an endothermic agent. The endothermic agent is distributed, dispersed and suspended within and throughout the polymer and cured to form a composite for use in insulating, thermoprotecting, heat absorbing applications on the one hand and heat maintenance applications of all types on the other.

BACKGROUND OF THE INVENTION

All of the prior art known to Applicant teaches the use of endothermic agents in heat sinks wherein the endothermic agents are either coated, adsorbed or packed into various supporting structures.

For example, Applicant's first patent U.S. Pat. No. 4,449,916; discloses an endothermic agent adsorbed onto the fibers of the fabric matrix.

Applicant's second patent, U.S. Pat. No. 5,709,914 discloses an thermal storage compound packed into an open cell network, comprising natural, synthetic or metal fibers, spheres, particles, foams, or materials capable of being formed into a container suitable for enclosing and maintaining an item's high heat.

There are two very serious drawbacks to the prior art. First, leakage of the endothermic or thermal storage compound to the surrounding environment can occur, if the physical integrity of the various underlying supporting structures is somehow compromised. Such leakage will diminish the effectiveness of the heat sink material and may even lead to the harm and destruction of the item or material the heat sink material is supposed to protect, particularly if the endothermic or thermal storage compounds are harsh and corrosive.

Second, the underlying structures upon which the endothermic or thermal storage compounds are coated, absorbed, adsorbed or packed tend to be stiff and inflexible. The further coating, absorption, adsorption and packing of endothermic or thermal storage compounds on and within such structures will cause them to stiffen even more. This stiffening of the material renders them entirely unsuitable in applications where the heat sink materials must be flexible and in certain situations light, thin and drapeable.

It is therefore an object of the present invention to provide a composition of matter that can act as a heat sink/heat shield, but which will resist leaking the endothermic compound into the environment, by eliminating any possibility of a compromise of the structural integrity of the underlying carrier or support structure in the heat sink material.

It is another object of the present invention to provide a composition of matter for applications requiring a heat sink/heat shield which needs to be thin, flexible, drapeable, and/or conformable, while simultaneously protecting and insulating against high or low heat environments.

It is yet another object of the present invention to provide a composition of matter for applications requiring a heat providing material which will be thin, flexible, drapeable, and/or conformable, while simultaneously protecting and insulating against extreme cold environments.

The aforementioned objects, as well as others, will be found in detail in the following written disclosure.

SUMMARY OF THE INVENTION

The inventive composition of matter is a flexible thermal control composite. Said composite comprises a polymer and an endothermic agent. The endothermic agent is dispersed, distributed, and suspended in the polymer. Thereafter it is cured to form a "P"olymer "C"ontaining an "E"ndothermic "A"gent (PCEA) composite. This composite now has thermal control properties that make it suitable for a multitude of thermal control applications.

Natural or synthetic polymer may be softened or liquified by being (1) heated, (2) dissolved or (3) suspended in a plasticizer or solvent. When the polymer treated in any of these manners has an endothermic agent added to it, in very specific concentrations, distributed, dispersed, suspended therein and cured, a thermal control composite i.e. a PCEA is formed. Such PCEA is in essence capable of thermal control through its ability to absorb and store heat or through its ability to first absorb heat and then release it. It does so through the use of its endothermic compounds' own inherent thermodynamic, physical and chemical properties, i.e. their latent heats of fusion, hydration, formation, decomposition, vaporization, sublimation, or its allotropic and phase change reactions; while simultaneously completely eliminating any possibility of leakage of its endothermic compounds into the environment, as said agents become an integral part of the PCEA overall physical structure.

Thus, according to the present invention there is provided a PCEA thermal control composite comprising a natural or synthetic polymer and an endothermic agent. The PCEA thermal control composite can be thin, as for example a thin or a thick film, or molded as a thick PCEA brick. When the PCEA is a thin film, then the effective distribution of the endothermic agents within said polymer is 0.0001 to 1.2 gram of endothermic or thermal storage compound per square inch of PCEA, the PCEA having a thickness of 0.05 to 2.0 mil. On the other hand, where the PCEA is a thick film or molded structure, then the effective concentration of endotherm will be 0.05%–60% by weight endotherm in PCEA.

Full details of the present invention are set forth in the following description and illustrated in the accompanying drawings.

BRIEF DESCRIPTION OF THE DRAWING

FIG. 13 is a perspective view of a container incorporating one of the embodiments of the PCEA;

FIG. 14 is a somewhat schematic, perspective view of a winter or hunting jacket, incorporating a preferred embodiment of the present inventive PCEA;

FIG. 15 is a cross-sectional view taken along 15—15' of the jacket in FIG. 14, showing another use of the PCEA, in the form of a mulch;

FIG. 16 is a somewhat schematic side view of the endothermic agent in the PCEA absorbing heat, thereby preventing the heat from reaching the heat sensitive device;

DETAILED DESCRIPTION OF THE PREFERRED EMBODIMENT

Figure 1:
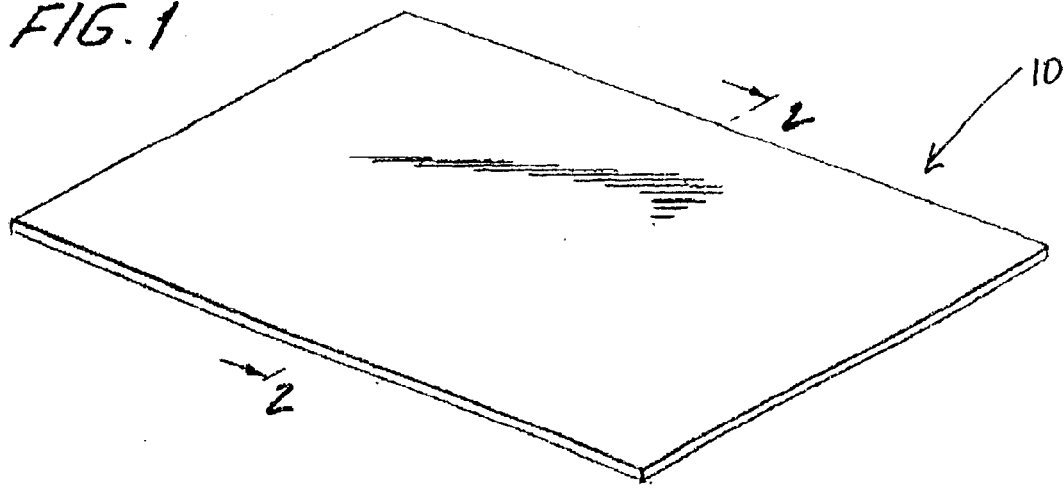
FIG. 1 is a perspective view of a thin film PCEA formulated in accordance with the present disclosure.
Figure 2:
FIG. 2 is a cross-sectional view taken along a line 2—2' of the thin film PCEA in FIG. 1.
Figure 3:
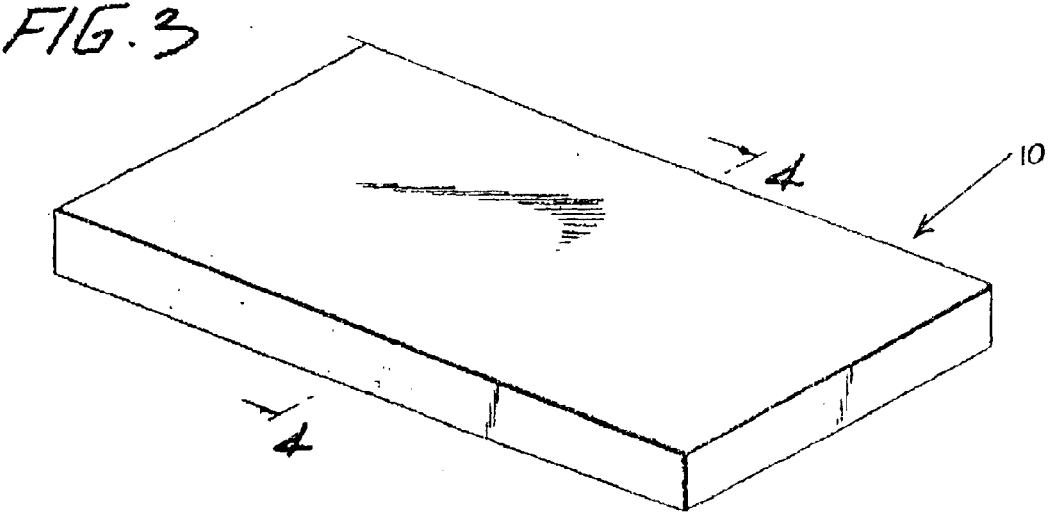
FIG. 3 is a perspective view of a thick film PCEA formulated in accordance with the present disclosure.
Figure 4:
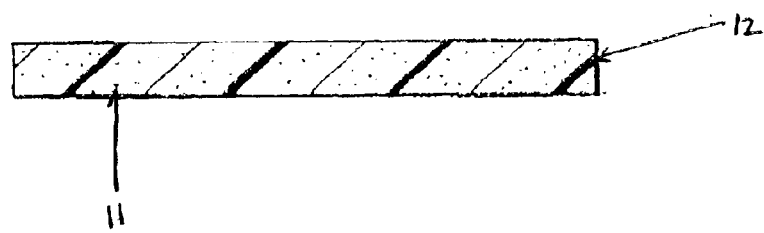
FIG. 4 is a cross-sectional view taken along a line 4—4' of the thick film PCEA in FIG. 3.
Figure 5:
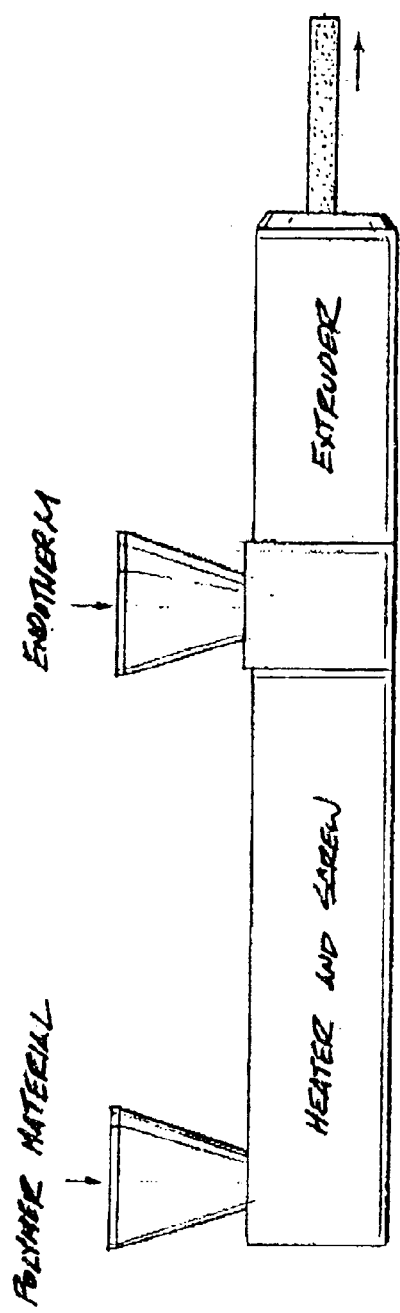
FIG. 5 is a schematic of an extruding apparatus used in the extrusion of PCEA fibers.
Figure 6:
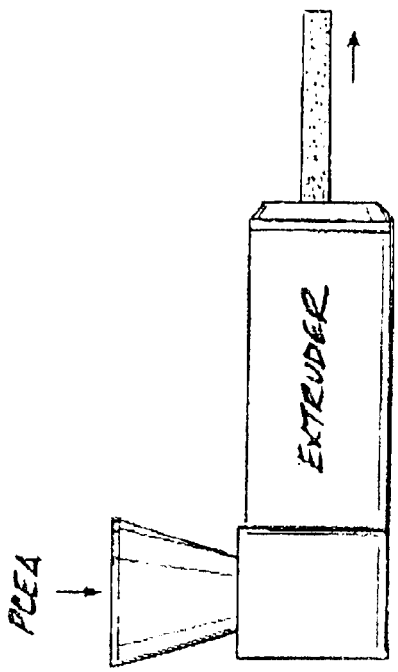
FIG. 6. is a schematic of a second type of extruding apparatus used in the extrusion of-PCEA fibers.
Figure 7:
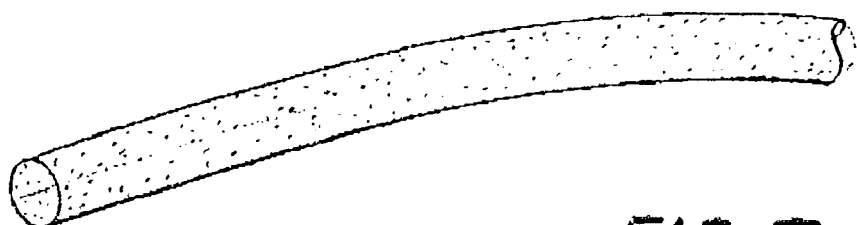
FIG. 7 is a perspective view of a PCEA fiber formulated and extruded in accordance with the present disclosure.

The inventive thermal control composite i.e. the PCEA material 10 of FIG. 1, FIG. 2, FIG. 3, and FIG. 4 shows the endothermic agent 11 dispersed, distributed and suspended within a polymer or plastic 12.

(a) The Polymer or Plastic.

The plastic or polymer 12 of the PCEA material 10 may comprise any natural or synthetic polymer or a mixture thereof. Such natural and synthetic polymers comprise: all latexes including those used in paint; fluoropolymers such as various TEFLON® species, specifically polytetrafluoroethylene (PTFE), polyfluoroacetate (PFA) and fluoroethylpropylene(FEP) and other fluorinated plastic films having similar thermal stability, i.e. FEP: -200 DEGREES C. TO 200 DEGREES C. and PFA: -200 DEGREES C. TO 250 DEGREES C., that are well known in the art; expanded TEFLON®; high temperature fluoroelastomers such as VITON® and other highly thermoresistant polymers and plastics well known in the art; elastomers such as SILICONE® species specifically polydimethylsiloxane and polymethylphenylsiloxane and other siloxanes well known in the art; polyimides such as KAPTON®; POLYESTERS® such as MYLAR®; high density polymers such as TIVAR® and SPECTRA®; and other polyamides, polyarylates, polyetherimides, polyketones, polyphenylene oxides or sulfides, polyphenylsulfones, polysulfones, acetals, nylons, ABS, polyetherketones, phenolics, polystyrenes, cellulose, polycarbonates, polyethylenes, polypropylenes, acrylics, polyurethanes, polyvinyls, polyvinylchlorides, BRICKLITE®, polymeric and plastic materials well known to those skilled in the art of plastic materials. Preferably though the carrier plastic or polymer 13 should be TEFLON®, SILICONE®, or VITON®.

These polymers can be photo, thermally or chemically cured. More importantly however, they have a molecular structure consisting of long chains of mostly linear molecules, which after being relaxed by either controlled heating, dissolution or suspension in a plasticizer or solvent, provide the interstitial spaces, through which the endothermic or thermal storage compounds weave and are distributed prior to curing and the final formation of the PCEA.

(b) The Endothermic Agent

An endothermic compound or agent is by definition a compound that absorbs heat. The endothermic agents of the present invention can be strict endotherms, i.e. they absorb and retain heat without releasing it into the surrounding environment. Or they can be recyclable endotherms, such as phase change materials, where they absorb heat initially and then they release the heat, if they are subjected to an environmental temperature differential.

The endothermic agents of the present invention comprise the following: oxidized and unoxidized polymers; oxidized and unoxidized homopolymers of ethylene polymer compounds; carbon monoxide-bonded copolymers; micronized polyethylene waxes such as stearic acid; waxes derived from petroleum; ethylene-bis-stearamide; N,N-ethylene-bis-stearamide; various tars; high molecular weight oils and hydrocarbons; polyvinyl alcohols; oxidized and unoxidized polyethylene homopolymers; carnauba wax; aluminum hydroxide, calcium hydroxide, potassium hydroxide, lithium hydroxide and the mixtures thereof; boric acid; dodecaborane, paraldehyde, paraformaldehyde, trioxane and the mixtures thereof; lithium formate, lithium acetate, lithium carbonate, calcium carbonate, silicon carbonate, magnesium carbonate, sodium bicarbonate and the mixtures thereof; salts of acetic acid, salts of formic acid, salts of boric acid and the mixtures thereof; lithium chloride trihydrate, lithium nitrate trihydrate, sodium carbonate decahydrate, sodium borate decahydrate, hydrated epsom salts, magnesium nitrate hexahydrate, beryllium sulfate tetrahydrate, sodium phosphate dodecahydrate, calcium chloride hexahydrate, zinc sulfate heptahydrate, magnesium chloride hexahydrate, sodium sulfate decahydrate, aluminum oxide trihydrate, aluminum sulfate decaoctahydrate, aluminum fluoride trihydrate, and the mixtures thereof; and any eutectic mixtures of any of these materials or families of materials including salts with melting points below 550 degrees Celsius.

These endothermic agents may be micronized and added to the polymer(s) after said polymer(s) have been relaxed by either controlled heating, dissolution or suspension in a plasticizer or solvent The endothermic agents are then subjected to a mixing process by which they are distributed through and suspended in the polymer(s)' interstitial spaces, or in the interstitial spaces of the outer surface of the polymer(s), and fixed therein through final curing steps which result in the inventive thermal control composite i.e. the PCEA.

The ultimate effective concentration of the endotherm in the PCEA is determined on a case by case application basis by such factors as: the particular application i.e. whether the application requires the absorption of heat or the release of heat, the needed heat capacity of the application, the type of polymer used, the particulate size of the endotherm, and the needed flexibility and use of the novel PCEA. Thus, when seeking a drapeable PCEA having a thickness of 0.3 to 1.0 mil for a heat absorbing/heat protective clothing application the carrier plastic or polymer may be a fluoroelastomer, and the concentration of the endothermic agent or thermal storage compound may range from 0.0001 to 1.2 grams of endotherm per square inch of PCEA; with a preferred concentration of 0.01 to 0.06 grams of endotherm per square inch of PCEA.

On the other hand, when seeking a flexible PCEA having an observable thickness of, for example 1 inch, then the carrier polymer may be a silicone and the effective concentration of the endotherm in the PCEA will be 0.05%–60% by weight endotherm in PCEA; with a preferred concentration of 20% by weight endotherm in PCEA, for extreme maximum flexibility relative to the highest heat capacity.

The heat absorption/heat protective and/or the heat release/heat preservation properties of the present inventive PCEA materials become readily apparent in the Test Examples below, which represent various embodiments of the inventive PCEAs.

(c) Embodiments of the Invention.

A series of different PCEAs were prepared in accordance with the principles and requirements as described above. Specifically, natural or synthetic polymers were selected from the group of polymers set forth above. These polymers in turn were softened or liquified by (i) heat, (ii) solution in a solvent or (iii) suspension in a plasticizer, using conventional methods of softening and liquification already known in the art of polymer handling and processing.

To these softened or liquified polymers, in turn, were added an endothermic or a recyclable endothermic agent, preferably micronized, selected from the group of endotherms or thermal storage compounds set forth above, in specific concentrations. The polymer and endotherm combinations were then mixed thoroughly to insure the distribution, dispersal, and suspension of the endotherms in the polymers's interstitial spaces; said spaces being formed during the softening of the polymers'long chains of mostly linear molecules. The mixtures were then molded and cured into PCEA thin and thick films, PCEA bricks, various shaped PCEA mulches or extruded, or extruded and spun into PCEA fibers. Alternatively, the PCEA mixtures were contacted, painted and cured onto a polymer substrate, so that upon cooling, or evaporation of the solvent or the plasticizer, the PCEA is literally adsorbed only on the surface of the underlying polymer substrate.

These PCEAS were then tested to determine their heat absorbing capacities and performance, using standard calorimeter testing procedures. The results of some of these PCEA calorimeter tests were as follows:

TEST EXAMPLE I

Polymer/Boric Acid Film

POLYMER: VITON OR OTHER FLUOROELASTOMER
ENDOTHERMIC AGENT: BORIC ACID I.E. A STRICT ENDOTHERM.
LATENT HEAT OF DECOMPOSITION OF BORIC ACID: 400 CAL/G
THICKNESS OF FILM: 0.001 INCH
CONCENTRATION OF BORIC ACID IN THE PCEA: 0.03 GM OF BORIC ACID PER SQUARE INCH OF PCEA.
AMOUNT OF HEAT ABSORBED: 10,368 CAL/SQ.YD; 8 CAL/SQ. IN.

TEST EXAMPLE II

Polymer/Wax Film

POLYMER: VITON OR OTHER FLUROELASTOMER
ENDOTHERIC AGENT: WAX I.E. RECYCLABLE ENDOTHERM CAPABLE OF ABSORBING HEAT AND THEN RELEASING IT.
LATENT HEAT OF FUSION OF WAX: 30 CAL/G
THICKNESS OF FILM: 0.001 INCH
CONCENTRATION OF WAX IN THE PCEA: 0.03 GM OF WAX PER SQUARE INCH OF PCEA.
AMOUNT OF HEAT ABSORBED: 1166.4 CAL/SQ.YD; 0.9 CAL/SQ. IN.

TEST EXAMPLE III

Silicone/Boric Acid Film

POLYMER: SILICON
ENDOTHERMIC AGENT: BORIC ACID I.E. A STRICT ENDOTHERM
LATENT HEAT OF DECOMPOSITION OF BORIC ACID: 400 CAL/G
THICKNESS OF FILM: 0.001 INCH OR 1.0 MIL
CONCENTRATION OF BORIC ACID IN THE PCEA: 0.05 GM OF BORIC ACID PER SQUARE INCH OF PCEA.
AMOUNT OF HEAT ABSORBED: 20 CAL/SQ. IN.

TEST EXAMPLE IV

Silicone/Endotherm PCEA

POLYMER: SILICONE
ENDOTHERMIC AGENT: HOMOPOLYMER I.E. A RECYCLABLE ENDOTHERM
LATENT HEAT OF FUSION OF THE HOMOPOLYMER: 80 CAL/GM.
PREPARATION: THE HOMOPOLYMER IS SUSPENDED IN A SILICONE GEL AND CURED.
RESULTS:
  (A) THE FLEXIBILITY VALUES ARE A DIRECT FUNCTION OF THE RATIO OF ENDOTHERM TO SILICONE;
  (B) AT A HOMOPOLYMER CONCENTRATION OF 10% BY WEIGHT HOMOPOLYMER IN SILICONE PCEA THE AMOUNT OF HEAT ABSORBED IS 8 CAL/100 GMS OF PCEA;
  (C) AT A HOMOPOLYMER CONCENTRATION OF 20% BY WEIGHT HOMOPOLYMER IN SILICONE PCEA, THE AMOUNT OF HEAT ABSORBED IS 16 CAL/100 GMS OF PCEA;
  (D) AT A HOMOPOLYMER CONCENTRATION OF 35% BY WEIGHT HOMOPOLYMER IN SILICONE PCEA, THE AMOUNT OF HEAT ABSORBED IS 28 CAL/100 GMS OF PCEA;
  (E) AT A HOMOPOLYMER CONCENTRATION OF 60% BY WEIGHT HOMOPOLYMER IN SILICONE PCEA, THE AMOUNT OF HEAT ABSORBED IS 48 CAL/100 GMS OF PCEA. NOTE THAT THE PCEA IS BRITTLE AND FLAKES I.E. MORE SUITABLE FOR MULCH TYPE APPLICATIONS;

TEST EXAMPLE IV

Silicone/Boric Acid PCEA

POLYMER: SILICONE

ENDOTHERMIC AGENT: BORIC ACID I.E. A STRICT ENDOTHERM

ENDOTHERM: BORIC ACID HAVING A LATENT HEAT OF FUSION OF 400 CAL/GM AT 140 DEGREES CELSIUS.

PREPARATION: THE BORIC ACID IS SUSPENDED IN A SILICONE GEL AND CURED.

RESULTS:
  (A) THE FLEXIBILITY VALUES ARE A DIRECT FUNCTION OF THE RATIO OF ENDOTHERM TO SILICONE;
  (B) AT A BORIC ACID CONCENTRATION OF 20% BY WEIGHT BORIC ACID IN SILICONE PCEA THE AMOUNT OF HEAT ABSORBED IS 80 CAL/100 GMS OF PCEA.

TEST EXAMPLE V

Fluorocabon/Carbon Monoxide Copolymer Film

POLYMER: FLUOROCARBON

ENDOTHERMIC AGENT: CARBON MONOXIDE COPOLYMER I.E. A RECYCLABLE ENDOTHERM

LATENT HEAT OF FUSION OF CARBON MONOXIDE COPOLYMER: 103 CAL/G

THICKNESS OF FILM: 0.001 INCH CONCENTRATION OF CARBON MONOXIDE COPOLYMER IN THE

PCEA: 0.06 GM PER SQUARE INCH OF PCEA.

AMOUNT OF HEAT ABSORBED: 6.2 CAL/SQ. IN.
  NOTE: Carbon monoxide copolymer is a recyclable endotherm. This means that after it has absorbed 6.2 cal/sq.in. the PCEA can be used to transfer 6.2 cal/sq.in. to a cold sensitive device, animal, or human, which is being exposed to extreme cold conditions.

TEST EXAMPLE VI

Fluorocarbon/Homopolymer Film

POLYMER: FLUOROCARBON

LATENT HEAT OF FUSION OF HOMOPOLYMER: 80 CAL/G

THICKNESS OF FILM: 0.001 INCH

CONCENTRATION OF HOMOPOLYMER IN THE PCEA: 0.06 GM PER SQUARE INCH OF PCEA.

AMOUNT OF HEAT ABSORBED: 4.8 CAL/SQ. IN.
  NOTE: The Homopolymer is a recyclable endotherm. This means that after it has absorbed 4.8 cal/sq. in. the PCEA can be used to transfer 4.8 cal/sq. in. to a cold sensitive device, animal, or human, which is being exposed to extreme cold conditions.

TEST EXAMPLE VII

Silicone/Homopolymer:Carbon Monoxide Copolymer PCEA

POLYMER: SILICONE

ENDOTHERMIC AGENTS: HOMOPOLYMER AND CARBON MONOXIDE COPOLYMER I.E. RECYCLABLE ENDOTHERMS LATENT HEAT OF FUSION OF THE HOMOPOLYMER IS 80 CAL/GM; CARBON MONOXIDE COPOLYMER HAVING 103 CAL/GM; 50:50 RATIO HAS A LATENT HEAT OF FUSION OF 91.5 CAL/GM.

PREPARATION: THE HOMOPOLYMER AND CARBON MONOXIDE COPOLYMER ARE SUSPENDED IN A SILICONE GEL AND CURED.

RESULTS:
  (A) THE FLEXIBILITY VALUES ARE A DIRECT FUNCTION OF THE RATIO OF ENDOTHERMS TO SILICONE;
  (B) AT ENDOTHERM CONCENTRATION OF 20% BY WEIGHT THE AMOUNT OF HEAT ABSORBED AND CAPABLE OF BEING RELEASED IS 1830 CAL/100 GMS OF PCEA.

It is clear from the above that PCEAs will perform superbly in applications directed to the absorption of heat. Furthermore, when the applications call for near isothermal conditions, i.e. two dimensional thermal conductivity or increased thermal conductivity along the surface plane, then any PCEA set forth in the examples above, or formed in accordance with the present disclosure, can be coupled with a metalized or thermally conductive material. This will diffuse the heat of hot spots across the entire surface of the PCEA. In fact, it was found that when a thermally conductive material was contacted to a 1.0 mil thick PCEA film comprising a homopolymer endotherm whose concentration was 0.02 gm of homopolymer endotherm per sq. in., the homopolymer (heat of fusion: 80 cal/gm) was capable of rapidly absorbing 2073.6 cal over 1 sq. yard; regardless of where the thermal flux was applied on the surface of the PCEA.

When the PCEA applications require some kind of ventilation and breathability, as for example in clothing, then the PCEA film can be pierced or provided with tears, holes, or openings. Such openings do not compromise the heat absorption performance of the PCEAs, nor do they affect the overall structural integrity of the application.

(d) Invention Applications.

The inventive PCEAs can be formed into thin and thick films. They may be drawn, molded or spun into fibers of all dimensions. They can be formed and chopped into PCEA mulch; the size of the mulch varying with the particular application. They can be molded into a brick or gasket. In fact, various modifications can be made to the present invention, as will be apparent to those skilled in the art; modifications which will depend on and become readily apparent from the particular applications for which the inventive PCEAs are intended for.

Figure 12:
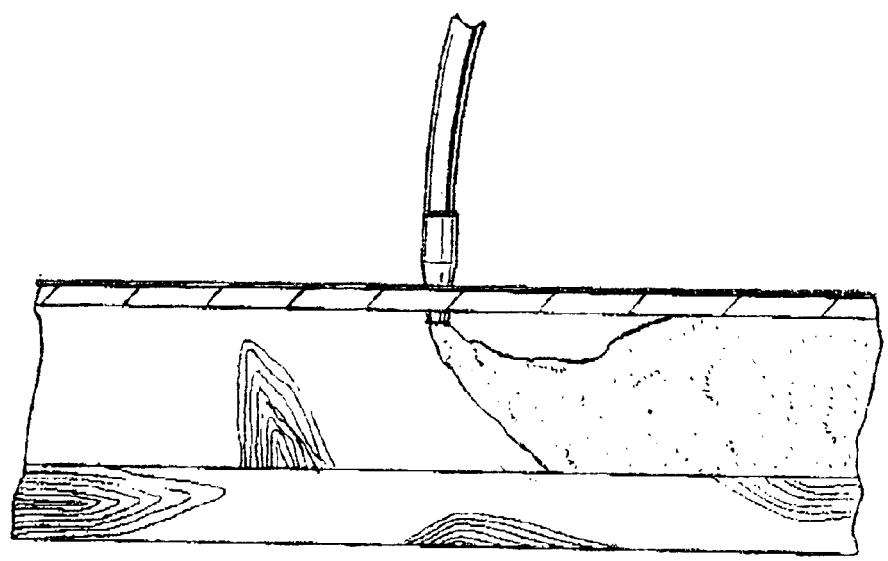
FIG. 12 is a schematic of the delivery of a PCEA into the inner walls of a home.

Thus, depending on the characteristics of the PCEA prepared, i.e. the heat capacity of its endothermic agent(s), the polymer(s) used, its form size and shape, the PCEA can be used for thermal control in protective clothing, winter clothing, boats, furniture, pipes, diving suits, hoses, auto interiors, fire walls, chemical processes, kitchen clothing and gear. Or, the PCEA can be used for environmental control in paint, pipes, tubs, walls as shown for example in FIG. 12, shipping containers, medical devices, food, homes, aircraft, automobiles and tanks. Finally the inventive PCEAs can be used as protective pads in gloves, shoes, lab coats, fire gear and even ablative surgery; while, recyclable PCEAs, which are endotherms that make use of their latent heats of fusion, are ideal in use for dive suits and warm weather clothing, tents and gear.

Figure 8:
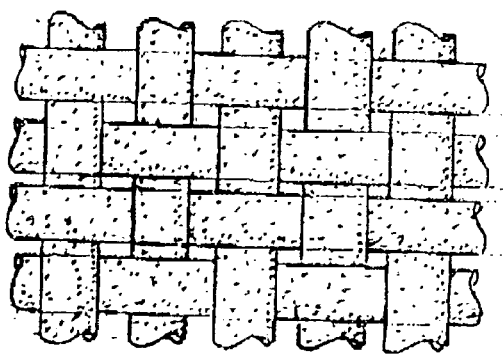
FIG. 8 and FIG. 9 are top plan views of PCEA materials assembled, woven or knit using PCEA fibers.
Figure 9:
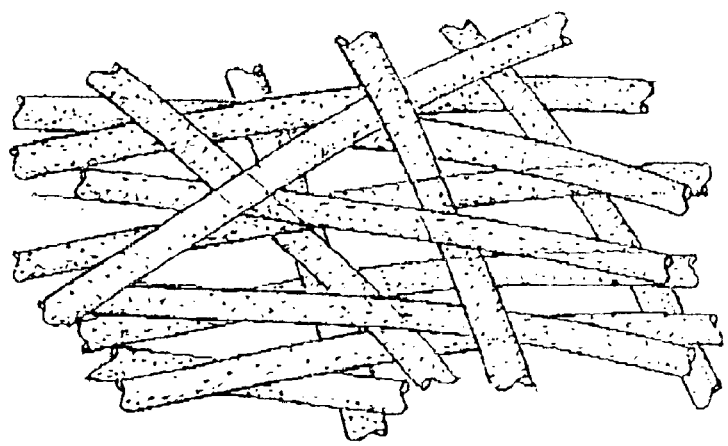
Figure 11:
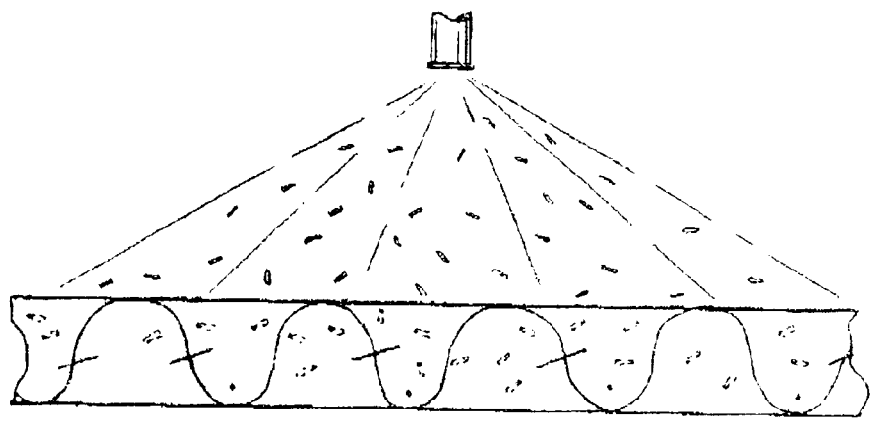
FIG. 11 is a schematic of a delivery and adhesion method of a large particulate PCEA onto a plastic substrate.
Figure 10:
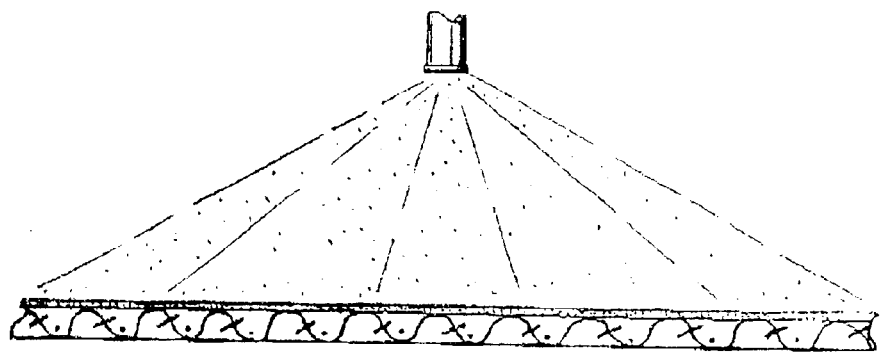
FIG. 10 is a schematic of a delivery and adhesion method of a small particulate PCEA onto a plastic substrate.
Figure 17A:
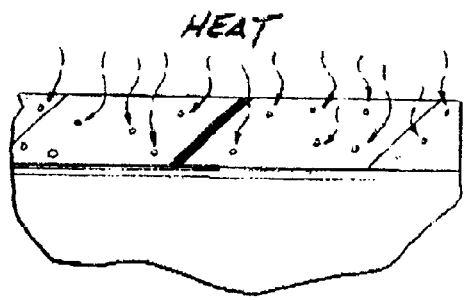
FIG. 17A and FIG. 17B are a somewhat schematic view of the inventive PCEA showing the recyclable endothermic agent first absorbing the heat (FIG. 17A) and then releasing the heat to the cold sensitive device, thereby maintaining the temperature of the cold sensitive device constant (FIG. 17B)
Figure 17B:
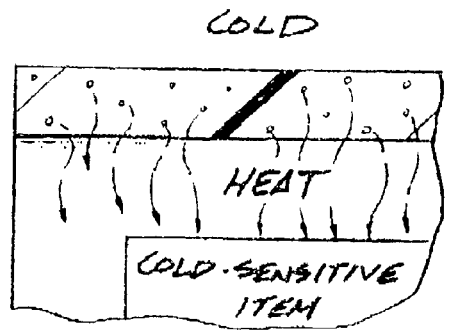
Figure 18:
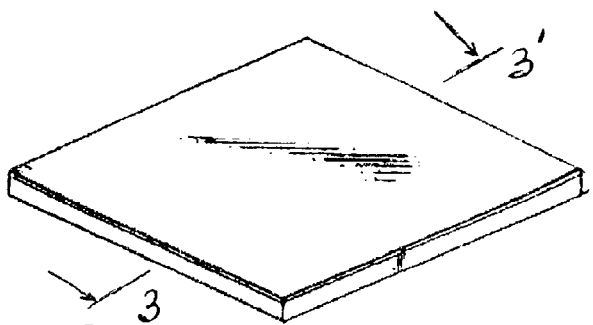
FIG. 18 is a perspective view of a thin film PCEA formulated in accordance with the present disclosure and contacted to a thermally conductive material, only on one side.
Figure 19:
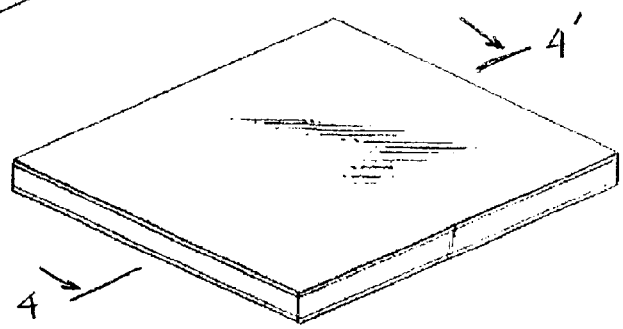
FIG. 19 is a perspective view of a thin film PCEA formulated in accordance with the present disclosure and sandwiched between two layers of thermally conductive material.
Figure 20:
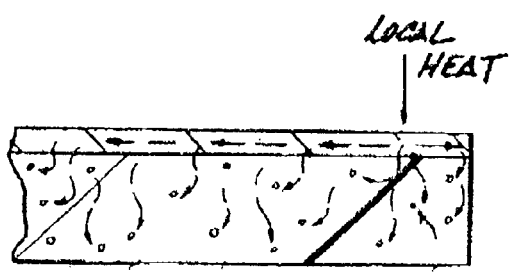
FIG. 20 is a cross-sectional view taken along a line 3—3' of the thin film PCEA/thermally conductive material in FIG. 18, wherein the heat of the hot spot applied to one end of the PCEA is diffused across the entire surface of the PCEA and thereafter is absorbed by the PCEA's endothermic agent.
Figure 21:
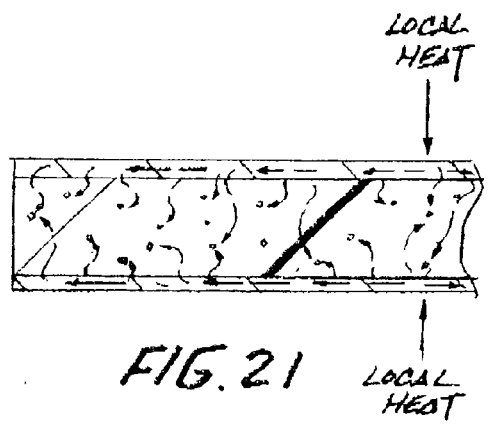
FIG. 21 is a cross-sectional view taken along a line 4—4' of the thick film thermally conductive material/PCEA sandwich of FIG. 19, wherein the heat of the hot spots applied to one end of the sandwich is diffused across the entire surface of the PCEA and thereafter is absorbed by the PCEA's endothermic agent.

In fact, the applications and uses of the inventive PCEA are infinite; limited only by the imagination of man and his ability to design new ways to protect in extreme environmental conditions, either hot or cold. Thus, the PCEA can also be formed into surfaces for use under carpets or adhered to carpets using a method such as that portrayed in FIG. 10 and FIG. 11 in an effort to keep homes in as near an isothermal situation as possible. On the other hand, the PCEA may also be used as a means of camouflage by the removal of the heat signature of military combat gear, troops and military vehicles; or as a flexible thermal shield for the protection of spacecraft electronics and satellites from the harmful effects of solar radiation. Finally, PCEA fibers can be knit, spun or woven into protective cloth as shown in FIG. 8 and FIG. 9, whose applications can also be infinite.

Accordingly, while only a few embodiments of the present invention have been shown and described, it is to be understood that many changes and modifications may be made thereunto without departing from the spirit and scope of the invention as disclosed herein.

The invention claimed is:

1. A cured flexible thermal control composite comprising an endothermic agent distributed, dispersed and suspended in a fluorelastomer having a molecular structure consisting of long chains of mostly linear molecules which prior to curing provide interstitial spaces through which the endothermic agent is distributed, dispersed and suspended and become fixed therein on curing.

2. The flexible thermal control composite of claim 1, further comprising a thermally conductive material contacted to said flexible thermal control composite.

3. The flexible thermal control composite of claim 1, wherein the endothermic agent is recyclable.

4. The flexible thermal control composite of claim 1, wherein the endothermic agent is micronized.

5. The flexible thermal control composite of claim 1, wherein said endothermic agent is selected from the group consisting of oxidized polymers, unoxidized polymers, oxidized homopolymers of ethylene polymer compounds, unoxidized homopolymers of ethylene polymer compounds, carbon monoxide-bonded copolymers, micronized polyethylene waxes, petroleum derived waxes, ethylene-bis-stearamide, N,N-ethylene-bis-stearamide, tars, high molecular weight oils, high molecular weight hydrocarbons, polyvinyl alcohols, oxidized polyethylene homopolymers, unoxidized polyethylene homopolymers, carnauba wax, aluminum hydroxide, calcium hydroxide, potassium hydroxide, lithium hydroxide, boric acid, paraldehyde, paraformaldehyde, trioxane, lithium formate, lithium acetate, lithium carbonate, calcium carbonate, silicon carbonate, magnesium carbonate, sodium bicarbonate, salts of acetic acid, salts of formic acid, salts of boric acid, lithium chloride trihydrate, lithium nitrate trihydrate, sodium carbonate decahydrate, sodium borate decahydrate, hydrated epsom salts, magnesium nitrate hexahydrate, beryllium sulfate tetrahydrate, sodium phosphate dodecahydrate, calcium chloride hexahydrate, zinc sulfate heptahydrate, magnesium chloride hexahydrate, sodium sulfate decahydrate, aluminum oxide trihydrate, aluminum sulfate decaoctahydrate, aluminum fluoride trihydrate, aluminum nitrate nonhydrate and any eutectic blends of any of these materials including salts with melting points below 550 degrees Celsius.

6. The thermal control composite of claim 3, wherein said recyclable endothermic agent is selected from the group consisting of oxidized polymers, unoxidized polymers, oxidized homopolymers of ethylene polymer compounds, unoxidized homopolymers of ethylene polymer compounds, carbon monoxide-bonded copolymers, micronized polyethylene waxes, petroleum derived waxes, ethylene-bis-stearamide, N,N-ethylene-bis-stearamide, tars, high molecular weight oils, high molecular weight hydrocarbons, polyvinyl alcohols, oxidized polyethylene homopolymers, unoxidized polyethylene homopolymers, carnauba wax, glycerin, glycol, and glycerin/glycol hydrated salts and any eutectic blends of any of these materials including salts with melting points below 550 degrees Celsius.

7. The flexible thermal control composite of claim 4, wherein the endothermic agent is recyclable.

8. The flexible thermal control composite of claim 7, wherein said recyclable, micronized, endothermic agent is selected from the group consisting of oxidized polymers, unoxidized polymers, oxidized homopolymers of ethylene polymer compounds, unoxidized homopolymers of ethylene polymer compounds, carbon monoxide-bonded copolymers, micronized polyethylene waxes, petroleum derived waxes, ethylene-bis-stearamide, N,N-ethylene-bis-stearamide, tars, high molecular weight oils, high molecular weight hydrocarbons, polyvinyl alcohols, oxidized polyethylene homopolymers, unoxidized polyethylene homopolymers, carnauba wax, glycerin, glycol, and glycerin/glycol hydrated salts and any eutectic blends of any of these materials including salts with melting points below 550 degrees Celsius.

9. The flexible thermal control composite of claim 3, wherein said recyclable endothermic agent is a phase change material.

10. The flexible thermal control composite of claim 1, in the form of a film.

11. The thermal control composite of claim 10, wherein said film has a thickness of 0.05 to 2.0 mil.

12. The thermal control composite of claim 10, wherein said film contains said endothermic agent in an amount of 0.0001 and 1.2 grams per square inch.

13. The thermal control composite of claim 1, in the form of a molded structure.

14. The thermal control composite of claim 13, wherein said molded structure contains said endothermic agent in an amount of 0.05 to 60% by weight of said molded structure.

15. A cured flexible thermal control composite comprising boric acid distributed, dispersed and suspended in a fluoroelastomer having a molecular structure consisting of long chains of mostly linear molecules which prior to curing provide interstitial spaces through which the boric acid is distributed, dispersed and suspended and become fixed therein on curing.

16. The cured flexible thermal control composite of claim 1 in the form of a drapable film adaptable for use in protective clothing.

17. The flexible thermal control composite of claim 1 which has been knit, spun or woven into protective cloth.

18. Method for achieving thermal control in extreme environmental conditions which comprises utilizing a cured flexible thermal composite according to claim 1 as or on a surface to acheive an isothermal situation.

19. Method for protecting spacecraft electronics and satellites from the harmful effects of solar radiation which comprises utilizing a cured flexible thermal composite according to claim 1 as a flexible thermal shield therefore.

20. Method for providing for absorption of heat which comprises utilizing a cured flexible thermal composite according to claim 1 in at least one of clothing, a boat, furniture, a pipe, a house, a diving suit, a hose, an auto interior, a fire wall, fire gear and chemical processing equipment.

* * * * *